United States Patent
Pratt et al.

(10) Patent No.: US 8,504,831 B2
(45) Date of Patent: Aug. 6, 2013

(54) SYSTEMS, METHODS, AND COMPUTER PROGRAM PRODUCTS FOR USER AUTHENTICATION

(75) Inventors: James Pratt, Round Rock, TX (US); Steven Belz, Cedar Park, TX (US); Marc Sullivan, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 317 days.

(21) Appl. No.: 12/961,590

(22) Filed: Dec. 7, 2010

(65) Prior Publication Data

US 2012/0144468 A1   Jun. 7, 2012

(51) Int. Cl.
*H04L 9/32* (2006.01)

(52) U.S. Cl.
USPC .......................................... 713/168; 713/150

(58) Field of Classification Search
None
See application file for complete search history.

(56) References Cited

U.S. PATENT DOCUMENTS

| | | | |
|---|---|---|---|
| 7,398,549 B2 * | 7/2008 | Ting | 726/5 |
| 2012/0079576 A1 * | 3/2012 | Han et al. | 726/7 |

* cited by examiner

*Primary Examiner* — Pramila Parthasarathy
(74) *Attorney, Agent, or Firm* — Parks IP Law LLC; Jennifer P. Medlin, Esq.

(57) ABSTRACT

Responsive to receiving an authentication request from a device, an authentication server determines a confidence level for the authentication request, generates a confidence-weighted challenge to the authentication request. The confidence-weighted challenge being weighted based upon a confidence level. The authentication server, responsive to receiving a challenge response to the confidence-weighted challenge from the device, determines whether to authenticate the user based upon the challenge response. If the authentication server determines that the challenge response satisfies an expected response known to the authentication server, the authentication server permits authentication of the user to access the device. If the authentication server determines the challenge response does not satisfy the expected response known to the authentication server, the authentication server denies authentication of the user to access the device.

20 Claims, 6 Drawing Sheets

SYSTEMS, METHODS, AND COMPUTER PROGRAM PRODUCTS FOR USER AUTHENTICATION

TECHNICAL FIELD

The embodiments presented herein relate generally to security and, more particularly, to systems, methods, and computer program products for user authentication.

BACKGROUND

Cloud computing typically refers to a computing environment in which users can access their content via a data network, such as the Internet, from any of a plurality of connected devices such as computers, mobile devices, and the like from various locations. From the user's perspective, cloud computing offers the convenience of content access while mobile and when working on projects from various computing locations.

As with any computing environment, cloud computing environments have security concerns, some of which are allayed through the use of multi-factor authentication schemes. While multi-factor authentication schemes are often sufficient to provide proper security of data, users having to constantly enter, often times repeating, information whether they are accessing their content from their mobile device, home computer, office computer, or other device, can become frustrating and time-consuming for users.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the invention.

According to one aspect described herein, a method for authenticating a user includes, responsive to receiving, at an authentication server, an authentication request from a device, determining a confidence level for the authentication request. The method also includes generating, at the authentication server, a confidence-weighted challenge to the authentication request. The confidence-weighted challenge is weighted by the confidence level. The method also includes, responsive to receiving, at the authentication server, a challenge response to the confidence-weighted challenge from the device, determining whether to authenticate the user based upon the challenge response. If the authentication server determines the challenge response satisfies an expected response known to the authentication server, the authentication server permits authentication of the user. If the authentication server determines the challenge response does not satisfy the expected response known to the authentication server, the authentication server denies authentication of the user.

In one embodiment, determining the confidence level includes determining the confidence level at a confidence server that is integrated with the authentication server.

In one embodiment, determining the confidence level includes determining the confidence level at a confidence server that is in communication with the authentication server by the authentication server generating a confidence query, sending the confidence query to the confidence server, and responsive to sending the confidence query, receiving the confidence level from the confidence server.

In one embodiment, determining the confidence level includes determining the confidence level based upon an authentication factor included in the authentication request, the authentication factor being selected from a group of authentication factors consisting of ownership factors, knowledge factors, and inherence factors. In one embodiment, the authentication factor is included in a user login.

In one embodiment, determining the confidence level is responsive to receiving a confidence modifier from an external source. The confidence modifier, in one embodiment, is a user behavior pattern. In another embodiment, the confidence modifier is a location such as a location received from a previous device to which the user was previously authenticated by the authentication server, a location received from a tracking system, a location of a previous device, a location of a current device to which the user has been authenticated by the authentication server, a location determined by an analysis of social network information associated with the user, or the like. In yet another embodiment, the confidence modifier is a characteristic such as a characteristic of an area surrounding a previous device to which the user was previously authenticated, a characteristic of an area surrounding the device, or the like. In still another embodiment, the confidence modifier is a report of fraudulent activity at a location in which the device is located. In another embodiment, the confidence modifier is a reported consistency of a connection between a user device to which the user has been authenticated by the authentication server and a wireless telecommunications network. In yet another embodiment, the confidence modifier is a time received from a previous device to which the user was previously authenticated by the authentication server, wherein the time is indicative of either a time since the user was authenticated on the previous device or a time since the user logged off the previous device. In another embodiment, the confidence modifier is a distance from a previous device to which the user was previously authenticated by the authentication server to the device. In yet another embodiment, the confidence modifier is a probability that the user could travel from the previous device to the device. In still another embodiment, the confidence modifier is a calendar entry associated with a calendar maintained by or for the user, wherein the calendar entry identifies an intended location of the user. In another embodiment, the confidence modifier is a purchasing history of the user. In yet another embodiment, the confidence modifier is a marketing datum associated with the user. In some embodiments, multiple confidence modifiers, such as a combination of two or more of the aforementioned confidence modifier types are received and the confidence level is determined based at least in part upon them.

In one embodiment, determining whether to authenticate the user based upon the challenge response includes determining whether to authenticate the user to access content via the device, wherein the content is stored in a content server.

In one embodiment, the method further includes the authentication server instructing the content server to provide the content to the device, wherein the content is identified in the authentication request.

In one embodiment, determining whether to authenticate the user based upon the challenge response includes determining whether to authenticate the user for a transaction.

According to another aspect, an authentication server for authenticating a user includes an input/output interface, a processor, and a memory in communication with the processor, the memory being configured to store computer-executable instructions that, when executed by the processor, make the processor operable to perform any of the aforementioned methods.

According to yet another aspect, a tangible computer-readable medium includes computer-executable instructions that, when executed by a processor, make the processor operable to perform any of the aforementioned methods.

DETAILED DESCRIPTION

As required, detailed embodiments are disclosed herein. It must be understood that the disclosed embodiments are merely exemplary examples that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials, or methods have not been described in detail in order to avoid obscuring the embodiments disclosed herein. Therefore, specific structural and functional details disclosed herein are not to be interpreted as limiting, but merely as a basis for the claims and as a representative basis for teaching one skilled in the art to variously employ the disclosed embodiments.

Figure 1:
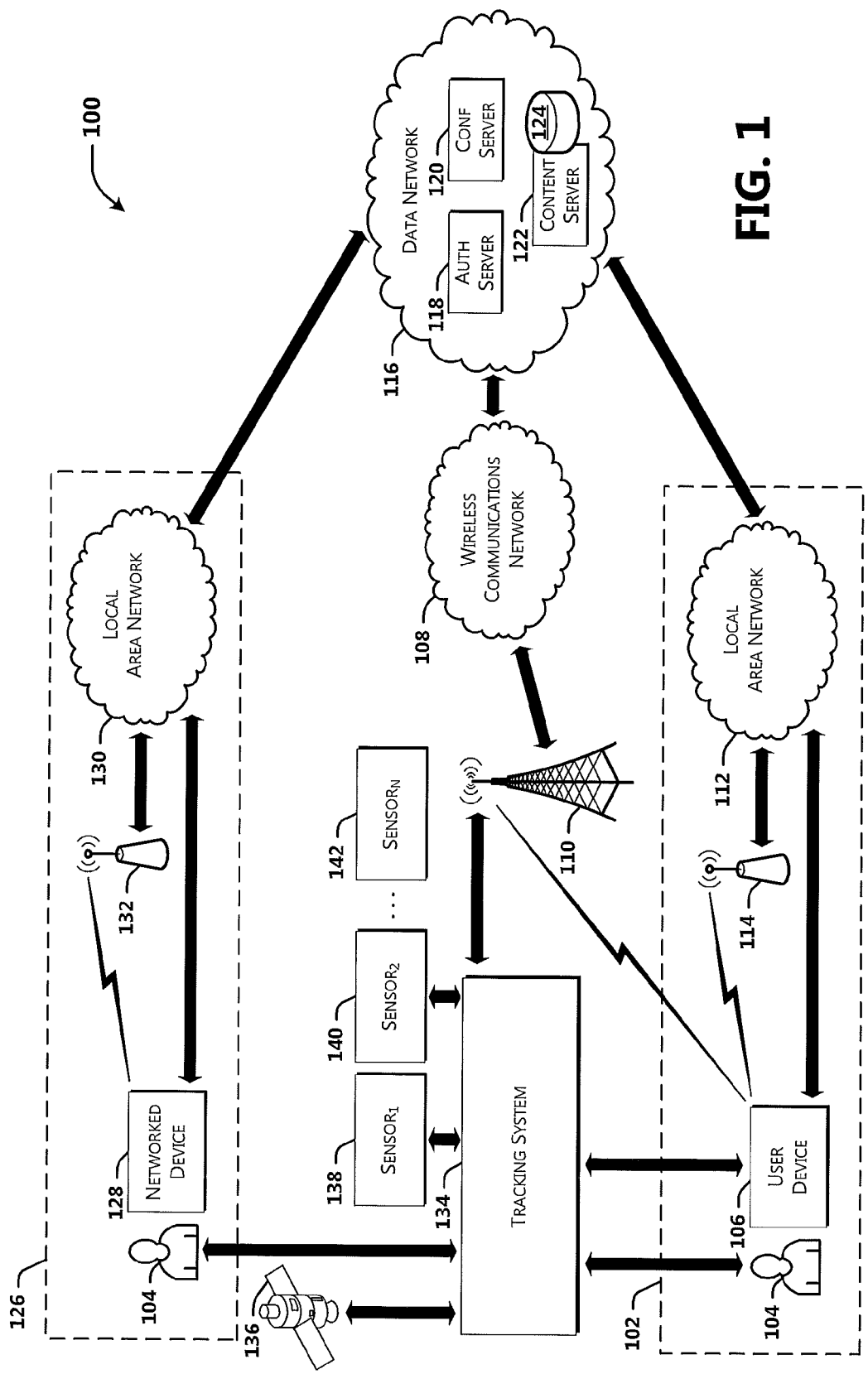
FIG. 1 schematically illustrates an exemplary environment in which various embodiments disclosed herein may be implemented.

Referring now to the drawings wherein like numerals represent like elements throughout the several figures, FIG. 1 schematically illustrates an exemplary environment 100 in which various embodiments disclosed herein may be implemented. The environment 100 includes a first location 102 in which a first user 104 is located. The first location 102 may be inside or outside of a building or other structure, in a park or other outdoor setting, or any other location. In one embodiment, the first location 102 is a location the first user 104 frequents such as home, office, or other location. Alternatively, the first location 102 may be a location the first user 104 rarely visits or has never before visited.

The first user 104 is associated with a user device 106. The user device 106 may be a wireless telephone (e.g., feature phone or smart phone), a computer (e.g., a tablet computer, portable computer, desktop, and the like), a media playback device (e.g., a portable music player, a portable recorder, or a portable video player), a handheld video game console, combinations thereof, or the like. In some embodiments, such as when the user device 106 is embodied as a wireless telephone, the user device 106 is carried by the first user 106 from the first location 102 to other locations like those described herein.

The user device 106, in some embodiments, is configured to access a wireless communications network 108 via a radio access network (RAN) 110. The wireless communications network 108 may operate using telecommunications standards such as Global System for Mobile communications (GSM) and a Universal Mobile Telecommunications System (UMTS). The wireless communications network 108 may alternatively or additionally use any existing, developing, or yet to be developed telecommunications technologies. Some examples of other suitable telecommunications technologies include, but are not limited to, networks utilizing Time Division Multiple Access (TDMA), Frequency Division Multiple Access (FDMA), Wideband Code Division Multiple Access (WCDMA), CDMA2000, Orthogonal Frequency Division Multiplexing (OFDM), Long Term Evolution (LTE), and various other 2G, 2.5G, 3G, 4G, and greater generation technologies. Examples of suitable data bearers include, but are not limited to, General Packet Radio Service (GPRS), Enhanced Data rates for Global Evolution (EDGE), the High-Speed Packet Access (HSPA) protocol family such as High-Speed Downlink Packet Access (HSDPA), Enhanced Uplink (EUL) or otherwise termed High-Speed Uplink Packet Access (HSUPA), Evolved HSPA (HSPA+), WiMAX™, and various other current and future data bearers.

The user device 106, in another embodiment, is additionally or alternatively configured to access a first local area network (LAN) 112 serving the first location 102 via one or more access points 114, such as an IEEE 802.11-compliant Wi-Fi™ access point or a femtocell node-B. The first LAN 112 may additionally or alternatively provide IEEE 802.3 (Ethernet) or other wired connectivity to the user device 106. The wireless communications network 108 and the first LAN 112 are each in communication with a data network 116, such as the Internet.

The data network 116, in one embodiment, provides computers and other devices, such as the user device 106 and others described herein, centralized authenticated access to content, services, and applications from the location 102 and other locations described herein per a cloud computing model. In the illustrated embodiment, the data network 116 includes an authentication server 118, a confidence server 120, and a content server 122. Although illustrated as single network elements, the authentication server 118, the confidence server 120, and/or the content server 122 may alternatively be part of at least one server farm each consisting of two or more servers. Moreover, the authentication server 118 and the confidence server 120 may be integrated into a single server. In some embodiments, two or more of the authentication server 118, the confidence server 120, and the content server 122 are co-located in a single server chassis.

In some embodiments, the authentication server 118, the confidence server 120, and/or the content server 122 are particular to platforms configured for data storage, data backup, media content distribution (e.g., music, video, photography, graphics, video games, digital print media such as e-books, e-magazines, e-newspapers, and the like), application distribution (e.g., productivity, entertainment, news, sports, weather, web, media playback such as media download and media streaming, and the like), social networking, productivity web-based applications (e.g., email, word processing, spreadsheet, presentation, note-taking, graphics, photograph-manipulation, and the like), finance management (e.g., general banking, investments, loans, and other banking services), and the like. In some embodiments, the authentication server 118 and the confidence server 120 provide authentication functions for a plurality of content servers of disparate platforms. In some embodiments, the various platforms accessible via the data network 116 are capable of communicating data between each other. Other platforms may function as aggregators by which a user can access a plurality of platforms from a centralized server. As such, the content server 122 may aggregate the user's content from one or more platforms and be configured to provide content to the user after authentication.

As described above, one such platform is a social networking platform. The term "social network" and related terms are used herein to refer broadly to a social structure of individuals, businesses, organizations, and/or other entities connected by one or more types of interdependency, such as friendship, kinship, common interest, financial exchange, dislike, romantic relationship, religious beliefs, knowledge, education, prestige, or other relationship. Moreover, the social network may include one or more social network platforms by which members of the social network can interact. Exemplary social network platforms include, for example, Facebook™, Twitter™, LinkedIn™, MySpace™, Foursquare™, and the like. The social network platforms may be interconnected among each other and/or other platforms so as to share information upon user opt-in, or unless the user opts out.

The social network, in one embodiment, facilitates social introduction, social networking, professional networking, and/or dating services. For example, the social network may provide social services and information for purposes of personal development, such as self-improvement, self-fulfillment, charitable, philanthropic, volunteer, public services, community services, and humanitarian activities. By further example, the social network may provide professional services and information for purposes of professional development, such as education, training, and practice development.

In one embodiment, the social network is a computer service such as an on-line virtual community for members to organize groups and events, participate in discussions, and/or engage in social, business, and community networking. In another embodiment, the social network is a computer service for hosting electronic facilities for others to organize and conducts meetings, events, and interactive discussions via the various networks illustrated in FIG. 1.

In another embodiment, the social network is provided by an application service provider (ASP) that hosts computer software applications of its own or others. In one embodiment, the ASP provides software that is accessible via, for example, a web application or website, a mobile device application, a computer application, or other device application that is configured to enable or facilitate the uploading, downloading, streaming, posting, displaying, blogging, linking, sharing or otherwise providing of electronic media or information over communication networks via the various networks illustrated in FIG. 1.

In yet another embodiment, the social network provides an online network service that enables users to transfer personal identity data to and share personal identity data with and among multiple websites.

In still another embodiment, the social network enables users to create personal profiles featuring social networking information and to transfer and share such information among multiple websites.

In another embodiment, the social network creates indexes of information, sites, and/or other resources available on computer networks, provides temporary use of non-downloadable software applications for social networking, creates a virtual community, and/or facilitates the transmission of audio, video, photographic images, text, graphics, and/or data.

In another embodiment, the social network provides computer services in the nature of customized web pages featuring user-defined or specified information such as personal profiles, audio, video, photographic images, text, graphics, and/or data.

In another embodiment, the social network facilitates peer-to-browser photo sharing services, such as providing a website featuring technology enabling users to upload, view, and download digital photos.

In another embodiment, the social network provides computer services for providing a web site featuring technology that enables users to upload and share video, photos, text, graphics, and/or data.

In another embodiment, the social network provides computer services for creating and maintaining blogs.

In another embodiment, the social network provides a web hosting platform for use of non-downloadable software in connection with interactive, multiplayer, and/or single player games.

In another embodiment, the social network provides a platform for social multiplayer gaming in which users can interact via text, voice, and/or virtual interaction between virtual characters, machines, or objects before, during, or after a game experience.

Referring again to the authentication server 118, the authentication server 118 is configured to field authentication requests originating from various devices from which the user 104 is requesting access to content stored, for example, in one or more data stores 124 that are in communication with the content server 122 in the data network 116. The authentication server 118 is also configured to communicate with the confidence server 120 to obtain a confidence level for a given authentication request and, based at least in part upon the obtained confidence level, generate a confidence-weighted challenge for the user of the requesting device, as described in greater detail herein below with reference to FIG. 2. The authentication server 118 is also configured to field responses to confidence-weighted challenges. The authentication server 118 is also configured to determine, based upon a response received in reply to a confident-weighted challenge, whether to release access to content provided by the content server 122.

The confidence server 120 conducts confidence analyses of authentication requests, as described in further detail herein. The confidence server 120 also provides the results of such analyses as a confidence level to the authentication server 118 so the authentication server 118 can generate a confidence-weighted challenge for the user of the requesting device. As noted above, the authentication server 118 and the confidence server 120 may be integrated or independent of each other.

The content server 122 is configured to receive notification from the authentication server 118 that a user is authenticated to access requested content via a particular requesting device. The content server 122 may employ authorization mechanisms to ensure the user is also authorized to access the requested content. For example, a user may be authenticated to access the content server 122 but for one reason or another is not authorized to view, obtain, or otherwise interact with certain content. The content provided by the content server 122 and stored in the one or more data stores 124 may be content such as content described above as being in association with one or more platforms.

According to one exemplary use case, the user 104 may travel from the first location 102 to a second location 126, whereat the user may desire access to content via a networked device 128. The networked device 128, like the user device 106, may be any device capable of accessing the data network 116. For example, the networked device 128 may be a device configured like the user device 106, described above, or a computer embodied in various form factors including portable computers such as laptop/notebook/netbook/tablet computers, as well as stationary computers such as desktops, towers, server chassis (e.g., blade system or other), and all-in-one machines, and touch-based computing devices such as those integrated with furniture (e.g., bars or table tops), standalone, or hangable on a vertical surface like a wall or door. In some embodiments, the networked device 128 is a special-purpose computer such as a television with integrated services (e.g., access to media, social, and other platforms), set-top box (e.g., to provide access to media, social, and other platforms), kiosk, automated teller machine (ATM), or the like associated with a particular platform such as a media rental platform, financial platform, or other platform.

The networked device 128, in one embodiment, is owned and/or operated by a business that provides free or fee-based (e.g., pay-per-use, pay for time allotment, or subscription) access to the data network 116. In another embodiment, the networked device 128 is a public device, for example, a public-use computer. The networked device 128 may be configured to accept payment for use in the form of coin, paper bill, check, money order, credit card, debit card, charge card, ATM card, gift card, rewards card, electronic transfer, and short-range-communications-based payment such as near-field communications, radio frequency identification, or the like. In some embodiments, a short-range communications radio transceiver is integrated within or attached to a device such as a key fob, the user device 106, or some device carried by the user 104, or the like. In one embodiment, the networked device 128 includes or is included as part of a vehicle such as an automobile, train, airplane, bus, boat, or other vehicle. In some embodiments, the networked device 128 is a factory-installed device or an aftermarket-installed device such as a terrestrial radio receiver, a satellite radio receiver, a media player (e.g., cassette, CD, DVD, Blu-ray™, digital media including music, video, interactive media such as video games, combinations thereof, and the like), a Global Positioning System (GPS) unit, a meter (e.g., fuel, voltage, temperature, oil pressure, exhaust gas temperature, boost pressure, revolutions per minute, speed, compass, clock, tire pressure, g-force meter, timer, and/or combinations thereof, and the like). Moreover, the networked device 128 may be portable so as to be removed from the vehicle when not in use.

In the illustrated embodiment, the networked device 128 is in wired communication with a second LAN 130 via a wired link such as IEEE 802.3 (Ethernet) and/or in wireless communication with the second LAN 130 via a wireless link provided by one or more access points 132, such as an IEEE 802.11-compliant Wi-Fi™ access point. Although not illustrated as such, it is contemplated that the networked device 128 may additionally or alternatively be in communication with the data network 116 via the wireless communications network 108 in a similar manner to that of the user device 106.

Although a single networked device is illustrated, multiple networked devices may be accessible from the second location 126. Moreover, more than the two locations 102, 126 are contemplated and any location may be static or dynamic. The user 104 may travel to any number of locations from which he or she desires to access content available via the data network 116 from one or more devices configured like one of the user device 106 and the networked device 128.

As the user 104 moves between locations, be it the illustrated locations 104, 126 or others, not illustrated, the user 104 and/or the user device 106 is, in some embodiments, tracked by a tracking system 134. The tracking system 134 may be in communication with the RAN 110 as illustrated and additionally or alternatively one or more of the other illustrated networks to facilitate communications with the data network 116. The tracking system 134 may partially or wholly integrate as a component of one or more of the illustrated networks. Alternatively, the tracking system 134 may be partially or wholly integrated into the networked device 128 and/or the user device 106. In some embodiments, the tracking system 134 functions to aggregate data from one or more GPS satellites 136 and/or one or more sensors 138, 140, 142, shown in the illustrated embodiment. In other embodiments, the tracking system 134 is merely a logical association of location tracking components of the illustrated environment 100 such as the one or more GPS satellites 136 and/or the one or more sensors 138, 140, 142.

The illustrated tracking system 134, in one embodiment, collects data from the one or more GPS satellites 136 to obtain a location fix of the user device 106, or separate GPS device such as one that is wearable by the user 104 in or as a garment or accessory, portable, or embedded in or otherwise connected to the body of the user 104.

The tracking system 134 may additionally or alternatively be in communication with one or more sensors 138, 140, 142 to obtain data associated with the location of the user 104. The sensors 138, 140, 142 may include, for example, still cameras, video cameras, inertial navigation unit (INU), biometric sensors, and the like. One or more of the sensors 138, 140, 142 may be part of an established sensor grid including, for example, traffic cameras, security cameras, retinal scanners, fingerprint scanners, voice recognition devices, other biometric sensors, and the like.

In some embodiments, the tracking system 134 operates to aggregate data from the GPS satellite 136 and/or the sensors 138, 140, 142 and provide at least a portion of the aggregated data to the confidence server 122 whereat the aggregated data is considered as a potential confidence modifier. That is, the data collected by the tracking system 134 may be considered by the confidence server 122 during a confidence analysis and the resulting confidence level of the confidence analysis may be lowered or raised.

Other location determining techniques are contemplated such as triangulation techniques that are reliant on resources of one or more of the wireless communications network 108, the LANs 112, 130, and/or other networks such as those operating in other locations (not shown), and other techniques such as gateway mobile location center (GMLC) location queries.

Figure 2:
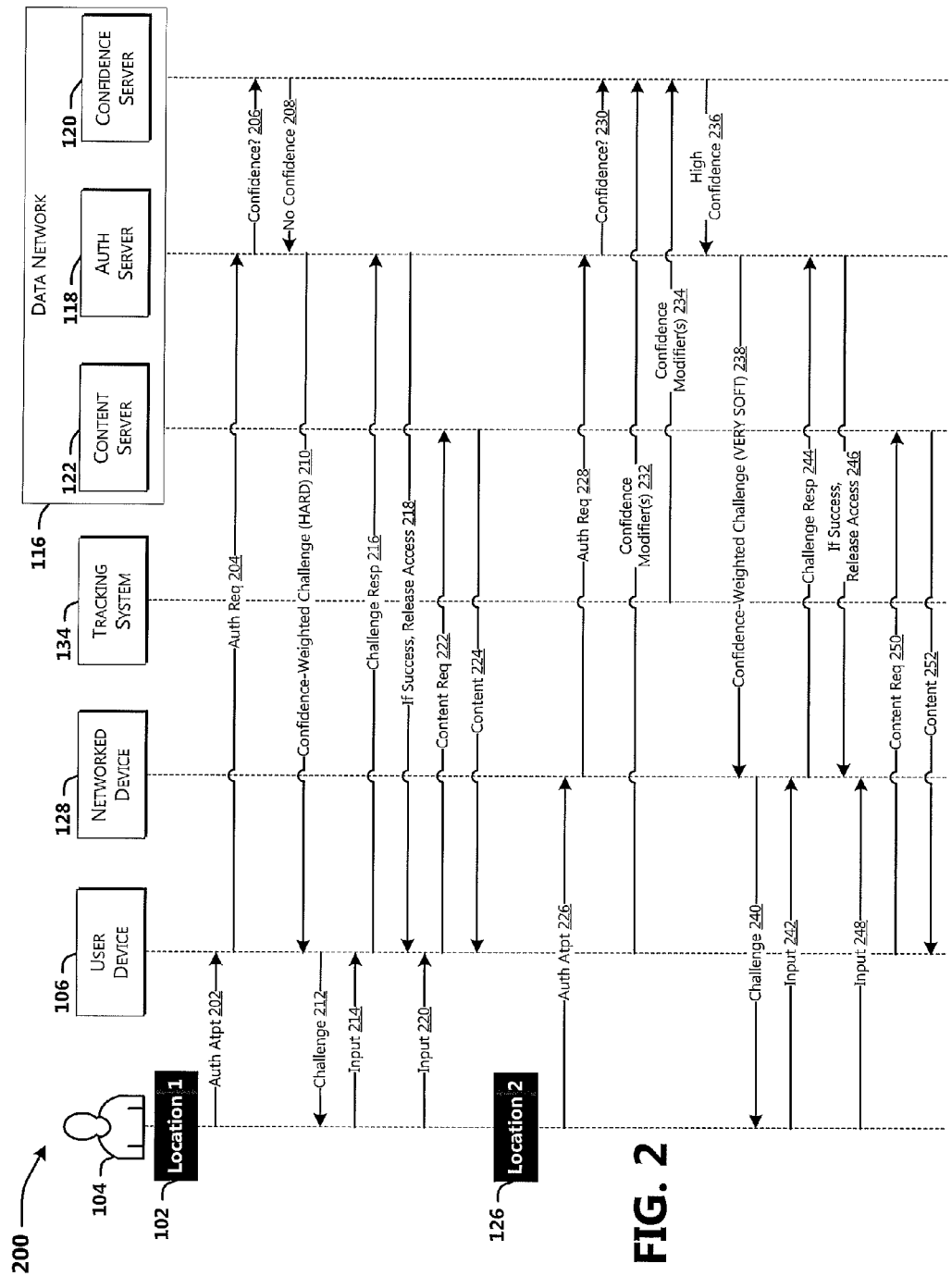
FIG. 2 schematically illustrates a method for authenticating a user to access content from multiple devices at different locations, according to one embodiment described herein.

Referring now to FIG. 2, a method 200 for authenticating a user to access content from multiple devices at different locations is depicted as a sequence diagram. It should be understood that the steps or other interactions between the illustrated elements of the method 200 are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims. It should also be understood that the method 200 can be ended at any time. In certain embodiments, some or all steps of the method 200, and/or substantially equivalent steps can be performed by execution of computer-executable instructions stored or included on a non-transitory computer-readable medium. The term "computer-readable medium" and variants thereof, as used herein refers to storage media and communication media. In some embodiments, storage media includes volatile and/or non-volatile, removable, and/or non-removable media. For example, storage media includes random access memory (RAM), read-only memory (ROM), electrically erasable programmable read-only memory (EEPROM), solid state memory or other memory technology, compact disk (CD)-ROM, digital versatile disk (DVD), or other disk-based storage, magnetic tape, magnetic disk storage or other magnetic storage devices, or any other tangible, non-transitory media that can be used to store data accessible by a processor.

The illustrated diagram includes the user 104, the user device 106, the networked device 128, the tracking system 134, the data network 116, the content server 122, the authentication server 118, and the confidence server 120, each of which is described in detail above with reference to FIG. 1. The user 104 is initially located at the first location 102, whereat the first user 104 attempts to access content from the content server 122 via the user device 106. An authentication attempt 202 is illustrated as user input to the user device 106. The user input, in one embodiment, is a user login that includes one or more authentication factors. The authentication factors may include ownership factors (i.e., something the user has) such as digital certificate, token, ID card, and the like, knowledge factors (i.e., something the user knows) such as user ID, password, security question answer, personal identification number (PIN), pass phrase, and the like, and inherence factors (i.e., something the user is or does) such as biometrics (e.g., fingerprint pattern, retinal pattern, DNA sequence, face features, height, weight, and the like), signature, voice print, and the like.

The user device 106, in response to the authentication attempt 202, generates an authentication request 204 including the authentication factors included in the user login. The user device 106 sends the authentication request 204 to the authentication server 118. The authentication server 118, in response to receiving the authentication request 204, generates a confidence query 206 and sends the confidence query 206 to the confidence server 120.

The confidence server 120 performs a confidence analysis to determine a confidence level for the authentication request 204. In the illustrated embodiment, it is assumed that the login credentials included in the authentication request 204 are part of a fresh or initial login such as a first-time login attempt by the user 104 from the user device 106 or a login attempt by the user 104 from the user device 106 after a certain amount of time has elapsed since a previous login attempt. The amount of elapsed time for an authentication reset (i.e., all login credentials needed for a new authentication after reset) may be configurable by the user 104 or an operator of the authentication server 118.

In the illustrated embodiment, the confidence server 120 determines through confidence analysis that no confidence exists for this login attempt because the login is fresh and responds to the authentication server 118 with a no confidence notification 208. In one embodiment, the confidence server 120 stores information associated with the authentication request 204 for use in future confidence analyses, such as described below after the user 104 moves to the second location 126.

In one embodiment, a confidence analysis includes a determination of a probability, $p_1$, that the requesting user is who the confidence server 120 determines the user to be. In another embodiment, a confidence analysis includes a determination of a probability, $p_2$, that the requesting user is who the user represents they are. In another embodiment, a confidence analysis includes a determination of a probability, $p_3$, that the requesting user is located where the confidence server 120 determines the user to be located. In some embodiments, a confidence analysis includes a combination of the aforementioned probabilities. For example, a fully-authenticated user using a GPS-enabled device (e.g., the user device 106 in one embodiment) is likely to score high (e.g., 100%) on each of these measures. Similarly, a fully-authenticated user using a tethered (e.g., Ethernet) device will score high in both of these areas if that device has a known and static location. A confidence analysis may repeat itself for N users, not just the illustrated user 104. Other factors, such as those now described below, may be considered in a probability determination.

In one embodiment, the authentication factors included in the authentication request 204 are weighted based upon indicators such as a stereotype of the user's behavior. For example, the stereotype of the user's behavior can be represented by patterns of previous user activity, such as the user accessing a business system during business hours, accessing a certain device during a particular time, accessing multiple systems at various locations within a certain time frame, and other patterns of previous user activity. The user's behavior and any underlying patterns may be weighted based upon, for example, how unique a particular pattern is compared to other patterns or indicators, or otherwise interpreted as the strength of the pattern or other indicator. Moreover, multiple corroborated patterns or other indicators may increase the strength of those indicators. However, if the indicators are correlated with each other at a population level, the indicators may be weaker. The population level, here, may refer to the density of individuals whom the authentication server 118 and/or the confidence server 120 could possibly misidentify instead of the actual individual (e.g., the user 104). The patterns and other indicators may be provided to the confidence server 120 as one or more confidence modifiers, as described in greater detail below.

The authentication server 118 generates a confidence-weighted challenge 210 which, in the illustrated embodiment, is a hard challenge due to the authentication request 204 effecting a fresh login. The confidence-weighted challenge 210 may challenge the user 104 to repeat some or all of the login credentials received in the authentication request 204 to ensure, for example, that the login credentials are being provided by the user 104 and not another person whom, in the meantime between the authentication request 204 and the confidence-weighted challenge 210, attempted to access content using the user's 204 login credentials. The confidence-weighted challenge 210 may additionally or alternatively include other authentication factors with which to challenge the user 104.

The user device 106 receives the confidence-weighted challenge 210 and presents the challenge 212 to the user 104 via an output component of the user device 106 such as a display, speaker and/or tactical feedback component of the user device 106. The user 104, in response to the challenge, can provide an input 214 from which the user device 106 generates a challenge response 216. The user device 106 sends the challenge response 216 to the authentication server 118.

The authentication server 118 compares the challenge response 216 to an expected response to the confidence-weighted challenge 210. If the challenge response 216 equals or fits the expected response, the authentication server 118 releases access 218 to the user device 106. In some embodiments, such as when the challenge response 216 includes biometric data, the expected response may be a range and so long as the biometric data is within the range, access is released. If, however, the challenge response 216 does not include the expected response, the authentication server 118 may simply not respond or send a notification (not shown) to the user device 106 informing the user 104 that the authentication attempt failed and, in some embodiments, may permit the user 104 to reenter a challenge response. In some embodiments, after a certain number of failed attempts, the user 104 is not permitted to authenticate via the user device 106 permanently or temporarily.

If access is released, the user 104 may provide input 220 to the user device 106 such as a selection of requested content from the content server 122. In some embodiments, this input is already known and may be included, for example, in the authentication request 204. In any case, the content server 122 is notified of the requested content either by the authentication server 118 (e.g., in the authentication request 204) or directly from the user device 106 in a content request 222. The content server 122 retrieves the requested content from the one or more data stores 124 and sends the content 224 to the user device 106.

In the illustrated embodiment, the user 104 leaves the first location 102 and enters the second location 126, in which the networked device 128 is located. In the second location 126, the user 104 attempts to access content from the content server 122 via the networked device 128. An authentication attempt 226 is illustrated as user input to the networked device 128. The user input, in one embodiment, is a user login that includes one or more authentication factors. These login credentials (authentication factors) provided in the authentication attempt 226 may be lesser than those of the fresh login (the authentication attempt 202) at the first location 102. The authentication factors may include ownership factors (i.e., something the user has) such as digital certificate, token, ID card, and the like, knowledge factors (i.e., something the user knows) such as user ID, password, security question answer, personal identification number (PIN), pass phrase, and the like, and inherence factors (i.e., something the user is or does) such as biometrics (e.g., fingerprint pattern, retinal pattern, DNA sequence, face features, height, weight, and the like), signature, voice features, and the like.

The networked device 128, in response to the authentication attempt 226, generates an authentication request 228. In one embodiment, fewer authentication factors are included in the authentication request 228 than those included in the authentication request 204 generated by the user device 106 so the user 104 can freely move between the illustrated locations 102, 126 and others (not illustrated) to access content from the content server 122 from various devices such as the those illustrated and others without needing to provide the same or same number of authentication factors. For example, the authentication factors included in the authentication request 204 may include a user ID, password, and some biometric authentication factor while the authentication factors included in the authentication request 228 may include a user ID and a password. Lesser generates an authentication request 228 including, if any, the authentication factors may be needed as the user 104 moves between the illustrated locations 102, 126 and/or to/from other locations (not shown).

The networked device 128 sends the authentication request 228 to the authentication server 118. The authentication server 118, in response to receiving the authentication request 228, generates a confidence query 230 and sends the confidence query 230 to the confidence server 120.

The confidence server 120 performs a confidence analysis to determine a confidence level for the authentication request 228. In the illustrated embodiment, the confidence server 120 is configured to receive one or more confidence modifiers 232, 234 from the user device 106 and the tracking system 134.

In one embodiment, the confidence modifier 232 received from the user device 106 includes a time since the user 104 was authenticated via the user device 106 or a time since the user logged off the user device 106. The confidence server 120 considers this time and the distance of the networked device 128 from the user device 106 to determine a confidence that the user 104 that logged in at the user device 106 is the same as the user now requesting authentication via the networked device 128. The confidence level, here, may be determined based upon a probability that the user 104 could travel from the first location 102 to the second location 126 in the time reported in the confidence modifier 232. For example, if the first location 102 is one hundred miles away from the second location 126 and the time reported in the confidence modifier 232 is two hours, the user 106 must have traveled at an average speed of fifty miles per hour to be able to request authentication via the networked device 128. In some instances, such as in a rural area in which there are minimal obstacles to potentially slow the user's 104 travel (e.g., traffic, traffic signals/signs, construction, speed limits, and the like), the confidence server 120 may determine that the probability of the user 104 traveling from the first location 102 to the second location 126 is quite high. In other instances with the same reported time and distance, the probability that the user 104 could travel from the first location 102 to the second location 126 may be low, such as when the user 104 is traveling through a congested city. Other modes of travel such as by train, airplane, bus, or others may be considered in the determination of a confidence level. In some embodiments, factors such as historical travel times of the user 104 and/or others, current traffic conditions, time-of-day, and the like are also considered in determining a probability. Data associated with these factors may be obtained from databases configured to store such data, such as map databases, traffic databases, weather databases, and the like (not shown).

The confidence modifier 234, in one embodiment, includes location information from the tracking system 134. For example, if the user 104 is tracked by a GPS-enabled device (e.g., the user device 106 in one embodiment or another GPS-enabled device), the confidence modifier 234 may include information about the location of the user 104 for a certain time.

In one embodiment, one or more confidence modifiers are received from one or more social networking platforms. A social networking platform may provide information in a confidence modifier that serves to strengthen or weaken the confidence of a particular authentication attempt based upon activities of the user 104 via the social networking platform. Activities include, for example, user posts, posts from others on the social networking platform about the user 104, or other activities that provide some indication of the user's 104 current or intended future location. The user 104 may provide in a post their current location which may be tied, for example, to a particular business or other known location. The user 104 may provide in a post a current event the user 104 is attending for which a location is known or may be estimated. The user 104 may provide in a post an expressed intention to attend a future event for which a location is known. Posts from others on the social networking platform may also indicate a current or future location of the user 104.

In one embodiment, a social networking platform that is configured to share information about its users with the confidence server 120 via one or more confidence modifiers may be further configured to provide optional privacy settings through which the user 104 may opt-in or opt-out to the social networking platform sharing information with the confidence server 120. In one embodiment, the social networking platform is configured to flag certain data as being salient to a confidence analysis. Instructions for the salience determination and flagging may be provided to the social networking platform by the confidence server 120. Information flagged by the social networking platform may be sent to the confidence server 120 automatically or upon request from the confidence server 120. In another embodiment, the social networking platform shares all social networking information associated with the user 104 with the confidence server 120 which performs the salience determination as part of the confidence analysis. The confidence server 120 and the social networking platform may communicate via a push or a pull configuration.

Other confidence modifiers include, but are not limited to, the location of the device or system being accessed (e.g., the user device 106 or the networked device 128 in the illustrated embodiment), characteristics of the area surrounding the device or system, behaviors of members of a particular population, and previous fraudulent activities at the location (e.g., high risk area may trigger a lower confidence level about any user's identification and require a higher level of authentication versus a device or system that has never been associated with fraudulent behavior). With regard to behaviors of members of a particular population, if someone located within a certain distance of the user 104 has been the target of online fraud, for example, or has been in the presence (virtual or real) of an individual known to be a perpetrator of online fraud, the confidence server 120 could adjust the confidence level accordingly. Another confidence modifier may be based upon signal interference that could indicate congestion which in turn could be grounds for increasing the authentication factors required for successful authentication.

Further, the ability of the tracking system 134 to detect and follow (without dropped signal) the location and identity of the user 104 is yet another confidence modifier. If the tracking system 134 experiences frequent drops or interruptions, the confidence server 120 may determine the confidence level to be lower than similar instances in which drops or interruptions are less prevalent. Another confidence modifier may include the time between the last connection, as well as corroboration between time and distance from last connection. Still other confidence modifiers include information from other sources such as email, electronic calendar (e.g., meetings or events with location information), biometric, gesture, motion detection, near-field communications between devices, time, time and distance relationships, purchasing history, marketing data about the user's 104 segment or persona, historic behavior of similar or associated users (e.g., friends, relatives, work associates, and the like) and the like.

In the illustrated embodiment, the confidence server 120 determines through confidence analysis, based upon the authentication factors included in the authentication request 228 and the confidence modifiers 232, 234, that high confidence exists for this login attempt and responds to the authentication server 118 with a high confidence notification 236. In alternative embodiments, the confidence server 120 may determine through a confidence analysis that low or medium confidence exists for a particular login attempt.

The nature of the confidence levels, including, for instance, a number of levels and conditions qualifying assignment of a particular confidence of no, low, medium, or high, in one embodiment, arbitrary and based upon business needs and desires. In addition to low, medium, and high confidence levels, for instance, a system designer or operator may set other confidence levels, such as levels 1-10, A-Z, 0%-100%, or the like.

In one embodiment, the confidence server 120 considers available data including confidence data and tracking data about the user 104 and determines a probability of login at the location and time of the subsequent login. Continuing with the exemplary scenario involving high, medium and low confidence levels, an example of low probability, and hence low confidence, is the user 104 having been disconnected for several hours. Conversely, an example of high probability, and hence high confidence, is the user 104 attempting a login during a pre-defined time into a device or system that is located within some pre-defined distance of a previous device or system to which the user 104 was previously authenticated.

The authentication server 118 generates a confidence-weighted challenge 238 which, in the illustrated embodiment, is a very soft challenge. The networked device 128 receives the confidence-weighted challenge 238 and presents the challenge 240 to the user 104 via an output component of the networked device 128 such as a display, speaker and/or tactical feedback. The user 104, in response to the challenge, can provide an input 242 from which the networked device 128 generates a challenge response 244. The networked device 128 sends the challenge response 244 to the authentication server 118.

The authentication server 118 compares the challenge response 244 to an expected response to the confidence-weighted challenge 238. If the challenge response 238 equals or fits the expected response, the authentication server 118 releases access 246 to the networked device 128. In some embodiments, such as when the challenge response 238 includes biometric data, the expected response may be a range and so long as the biometric data is within the range, access is released. If, however, the challenge response 238 does not include the expected response, the authentication server 118 may simply not respond or send a notification (not shown) to the user device 106 informing the user 104 that the authentication attempt failed and, in some embodiments, may permit the user 104 to reenter a challenge response. In some embodiments, after a certain number of failed attempts, the user 104 is not permitted to authenticate via the networked device 128 permanently or temporarily.

If access is released, the user 104 may provide input 248 to the networked device 128 such as a selection of requested content from the content server 122. In some embodiments, this input is already known and may be included, for example, in the authentication request 228. In any case, the content server 122 is notified of the requested content either by the authentication server 118 or directly from the networked device 128 in a content request 250. The content server 122 retrieves the requested content from the one or more data stores 124 and sends the content 252 to the networked device 128.

In a first exemplary use case, the user 104 is in possession of the user device 106 embodied as a wireless phone to which the user 104 is fully authenticated and, therefore, the probability on the device 106 is high, such as determined by the authentication scheme provided in steps 202-218. The user 104 walks up to the networked device 128 embodied as a computer terminal. Prior to the user 104 approaching the networked device 128, the probability on the networked device 128 is low. The location of the user device 106 matches or is within a pre-defined distance of the known location of the networked device 128 and, therefore, the probability on the networked device 128 increases because the proximity of the user device 106 to the networked device 128. The networked device 128 may recognize the user 104 and request one or more authentication factors if the probability does not exceed the device threshold (e.g., in the confidence-weighted challenge 238).

Alternatively, the networked device 128 may recognize the user 104 without any user interaction such as by using one or more sensors that are associated with the networked device 128, or in communication with the networked device 128 (e.g., one or more of the sensors 138, 140, 142 via any short-range communications, near-field communications, and the like as described above). Moreover, certain conditions or threshold requirements may dictate whether the networked device 128 can recognize the user 104 without any user interaction. For example, if the networked device 128 is in an area where no fraudulent activity has occurred and the networked device 128 does not detect the presence of another individual or device associated with that individual, the networked device 128 may recognize the user without any user interaction.

In another use case, if there are other users around the user 104 and the networked device 128 cannot generate sufficient certainty as to the identity of the user 104, the user 104 could approach the networked device 128 and be presented with a login request with some identifying information of the user 104 (e.g., name, account name, alias, user name, telephone number, email address, or the like) on a display of the networked device 128. The login request may be, for example, the confidence-weighted challenge 238 requesting the user 104 to provide one or more authentication factors.

In another use case, if there are other users around the user 104, the user 104 could approach the networked device 128 and a login request for the networked device 128 may appear on the display of the user device 106. The login request may be, for example, the confidence-weighted challenge 238 requesting the user 104 to provide one or more authentication factors via the user device 106 to be authenticated on the networked device 128.

In yet another use case, the user 104 could approach the networked device 128 and, via short-range communications or an accelerometer-based information exchange initiation technique such as Bump technology, the authentication credentials used in a previous user login via the user device 106 could be copied to the networked device 128 (i.e., available on the user device 106 and the networked device 128) or moved to the networked device 128 (i.e., available on the networked device 128 and no longer available on the user device 106).

In still another use case, as the user 104 moves away from the networked device 128, as measured by their fully-authenticated user device 106 and/or the tracking system 134, the user 104 is logged out of the networked device 128. The distance away from the networked device 128 may vary and may be configurable by the user 104 or the operator of the networked device 128.

Figure 3:
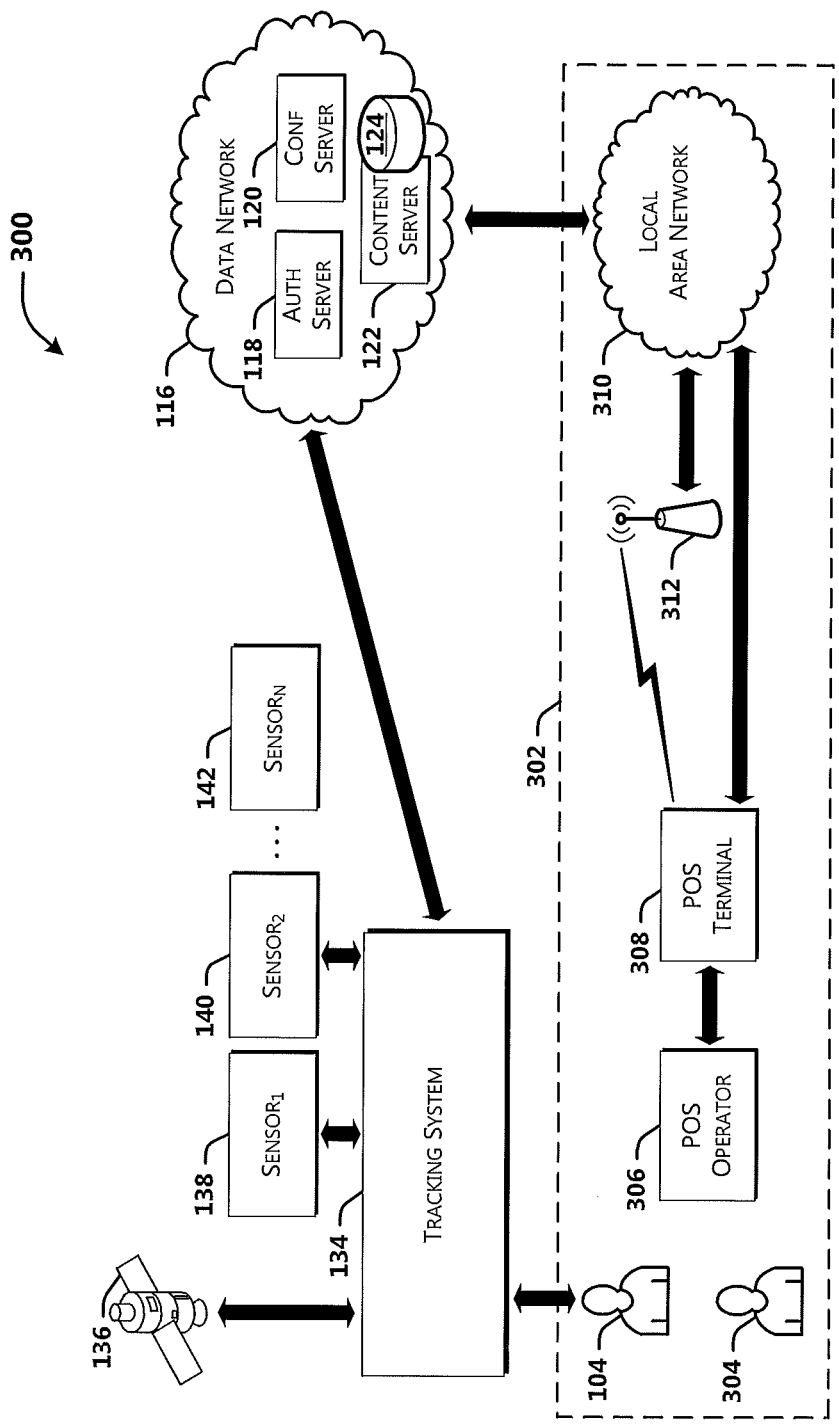
FIG. 3 schematically illustrates another exemplary environment in which various embodiments disclosed herein may be implemented.

Referring now to FIG. 3, an exemplary environment 300 is illustrated in which various embodiments disclosed herein may be implemented. The environment 300 includes a third location 302 in which the user 104 (hereinafter the first user 104) and a second user 304 are located. The third location 302 may be inside or outside of a building or other structure, in a park or other outdoor setting, or any other location. In the illustrated embodiment, the third location 302 includes a point-of-sale (POS) operator 306 and a POS terminal 308. The POS operator 306 may be a human or robot operating the POS terminal 308. The POS terminal 308 may be a handheld, portable POS system or a stationary POS system. Moreover, the POS system 308 may be configured to access a third LAN 310 serving the third location 302 via one or more access points 312, such as an IEEE 802.11-compliant Wi-Fi™ access point. The third LAN 310 may additionally or alternatively provide IEEE 802.3 (Ethernet) or other wired connectivity to the POS terminal 308.

The POS terminal 308 may provide typical check-out functions, such as scanning items, weighing items, calculating item totals, calculating pretax cost, calculating post tax cost, calculating money saved, verifying coupons, and others via communications with one or more store network systems, such as described below.

The third LAN 310, in one embodiment, provides the POS terminal 308 access to a store network including systems (not shown) for accounting, inventory, sales, membership, and store policies. Accounting systems are configured to perform accounting functions including, for example, establishing periodic (e.g., daily, weekly, bi-weekly, monthly, yearly) sales goals, managing store income and store expenses, managing payroll, managing tills, and other accounting services. Inventory systems are configured to perform inventory functions including, for example, promotions, store layout changes, end cap changes, sale items, item inventory statuses, re-order requests, eligible store and manufacturers coupons, and the like. Membership systems are configured to perform membership account management functions for store specific, franchise specific, chain specific, city specific, state specific, region specific, or customer specific membership programs. Memberships may be provided free or for a fee specified, for example, by the store owner. Policy systems are configured to store and manage membership policies for customers. Policies may be, for example, global, group specific, store specific, franchise specific, chain specific, city specific, state specific, region specific, or customer specific.

The remaining elements of FIG. 3 including the tracking system 134, the GPS satellite 136, the sensors 138, 140, 142, the data network 116, the authentication server 118, the confidence server 120, the content server 122, and the data store 124 are configured as described above with reference to FIG. 1.

Figure 4:
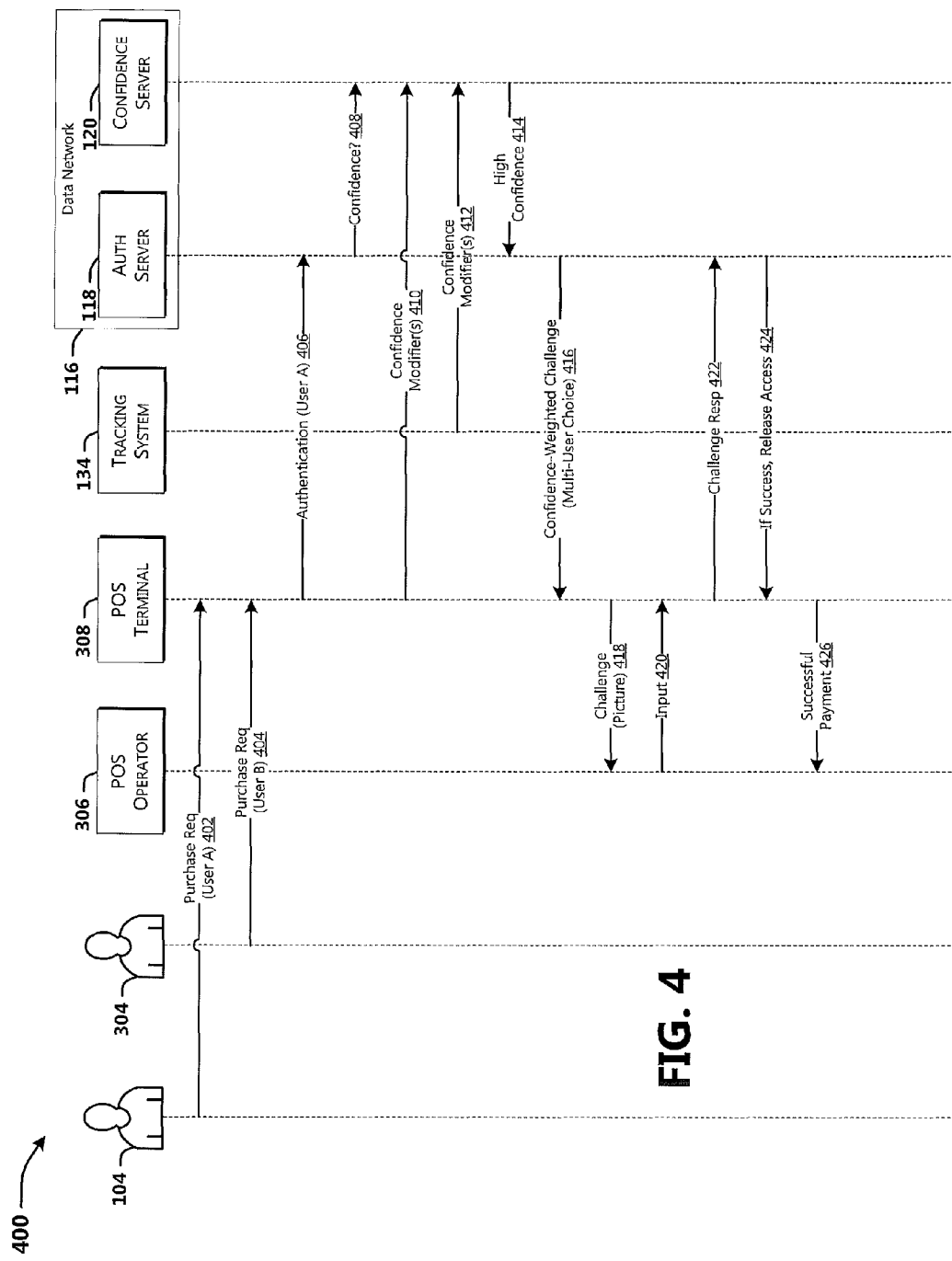
FIG. 4 schematically illustrates a method for authenticating a user for a transaction in a multi-user situation, according to one embodiment described herein.

Referring now to FIG. 4, a method 400 for authenticating a user in a multi-user situation is depicted as a sequence diagram, according to one embodiment. It should be understood that the steps or other interactions between the illustrated elements of the method 400 are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims. It should also be understood that the method 400 can be ended at any time. In certain embodiments, some or all steps of the method 400, and/or substantially equivalent steps can be performed by execution of computer-executable instructions stored or included on a non-transitory computer-readable medium. The term "computer-readable medium" and variants thereof, as used herein refers to storage media and communication media. In some embodiments, storage media includes volatile and/or non-volatile, removable, and/or non-removable media. For example, storage media includes random access memory (RAM), read-only memory (ROM), electrically erasable programmable read-only memory (EEPROM), solid state memory or other memory technology, compact disk (CD)-ROM, digital versatile disk (DVD), or other disk-based storage, magnetic tape, magnetic disk storage or other magnetic storage devices, or any other tangible, non-transitory media that can be used to store data accessible by a processor.

The illustrated diagram includes the first user 104, the second user 304, the POS operator 306, the POS terminal 308, the tracking system 134, the data network 116, the authentication server 118, and the confidence server 120, each of which is described in detail above with reference to FIGS. 1, 2. The first user 104 (user A in diagram) submits a purchase request 402 to the POS terminal 308. The purchase request 402 may be initiated between the POS operator 306 and the first user 104 and effected at the POS terminal 308, such as by the first user 104 speaking with and/or gesturing to the POS operator 306 to initiate the purchase request 402. Alternatively, the purchase request 402 is entered into the POS terminal 308 manually by the first user 104 or automatically by a device (e.g., the user device 106) that is fully authenticated to the first user 104 and is in proximity to the POS terminal 308. Meanwhile, the second user 304 also submits purchase request to the POS terminal 308 in a like manner. The POS terminal 308, in response, generates an authentication request 406 and sends the authentication request 406 to the authentication server 118. The authentication server 118, in response to receiving the authentication request 406, generates a confidence query 408 and sends the confidence query 408 to the confidence server 120.

The confidence server 120 performs a confidence analysis to determine a confidence level for the authentication request 406. In the illustrated embodiment, the confidence server 120 is configured to receive one or more confidence modifiers 410, 412 from the POS terminal 308 and the tracking system 134. In one embodiment, the confidence modifier 410 received from the POS terminal 308 includes a time since the first user 104 concluded a transaction with the POS terminal 308. The confidence modifier 412, in one embodiment, includes location information from the tracking system 134. For example, if the first user 104 is tracked by a GPS-enabled device (e.g., the user device 106 in one embodiment or another GPS-enabled device), the confidence modifier 412 may include information about the location of the first user 104 over time. In one embodiment, a confidence modifier is additionally or alternatively received from the user device 106. Other confidence modifiers such as those described above with reference to FIG. 2 are contemplated.

In the illustrated embodiment, the confidence server 120 determines through confidence analysis, based upon the authentication factors, if any, included in the authentication request 406 and the confidence modifiers 410, 412 that high confidence exists for this transaction and responds to the authentication server 118 with a high confidence notification 414. Alternatively, based upon the confidence analysis, the confidence server 120 may determine the confidence level to be no confidence, low confidence, or medium confidence.

The authentication server 118 generates a confidence-weighted challenge 416 which, in the illustrated embodiment, includes a multi-user choice. The POS terminal 308 receives the confidence-weighted challenge 416 and presents the challenge 418 to the POS operator 306 as a picture with multiple challenge answer options (e.g., faces of multiple users) via a display of the POS terminal 308. The POS operator 306, in response to the challenge 418, can provide an input 420 including a selection of one of the challenge answer options (e.g., "yes" or "no", or "match" or "no match"). Alternatively, the user 104 may provide the input 420 without the POS operator 306 being involved. The POS terminal 308 generates a challenge response 422 from the input 420. The POS terminal 308 sends the challenge response 422 to the authentication server 118. In an alternative embodiment, the POS terminal 308 includes a camera and is configured to capture an image of the first user 104 and select one of the challenge answer options based upon a match to the captured image.

The authentication server 118 compares the challenge response 422 to an expected response to the confidence-weighted challenge 238. If the challenge response 422 equals or fits the expected response, the authentication server 118 releases access 424 to the POS terminal 308 to proceed with processing the transaction. If, however, the challenge response 422 does not include the expected response, the authentication server 118 may simply not respond or send a notification (not shown) to the POS terminal 308 informing the POS terminal 308 that the authentication attempt failed and, in some embodiments, may permit the POS terminal 308 to reenter a challenge response and/or provide supplemental authentication factors retrieved from the first user 104. In some embodiments, after a certain number of failed attempts, the POS terminal 308 is permanently or temporarily not permitted to authenticate the first user 104 for the transaction. If access is released, the POS terminal 308 may process the transaction and notify the POS operator 306 of successful payment with a successful payment notification 426. The method 400 can end.

Figure 5:
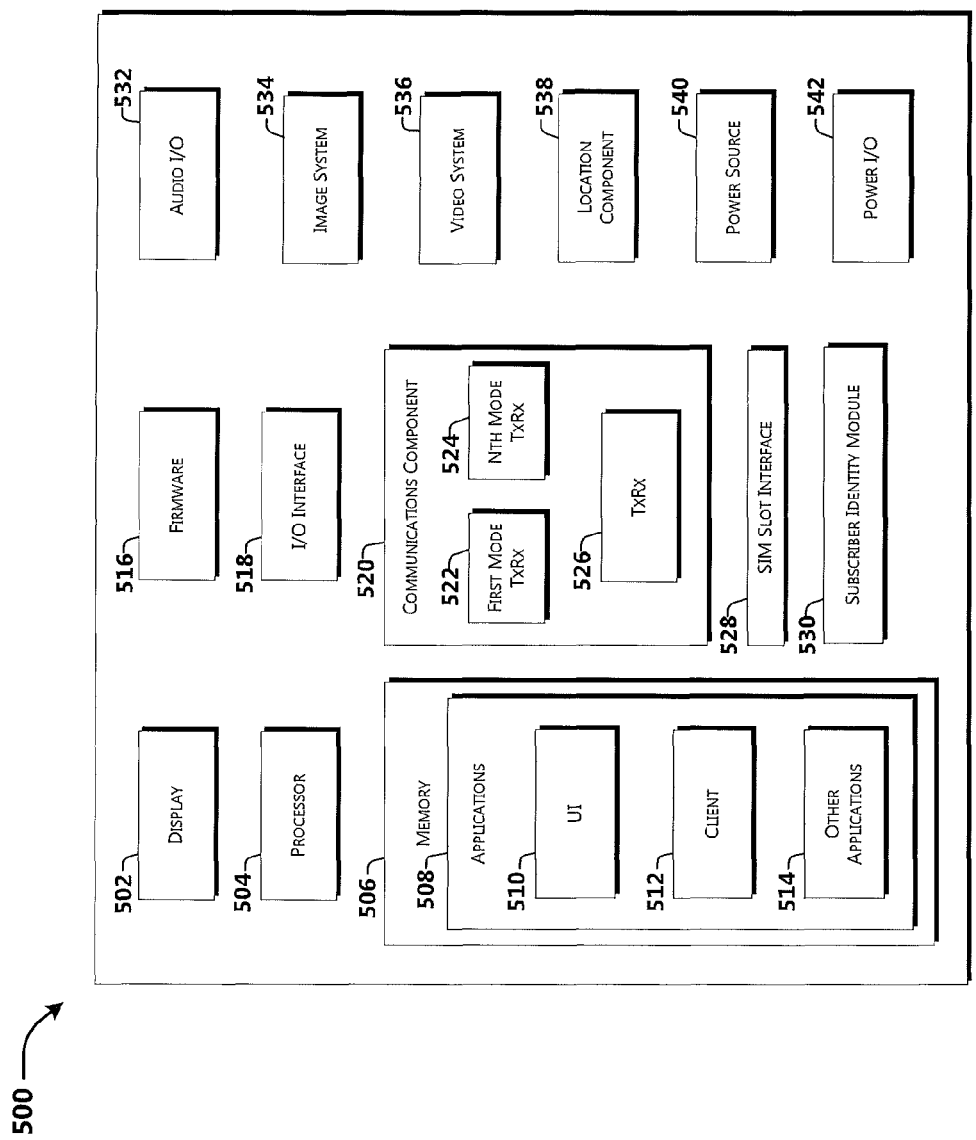
FIG. 5 schematically illustrates a mobile device and components thereof, according to one embodiment disclosed herein.

Referring now to FIG. 5, a schematic block diagram of an exemplary mobile device (MD) 500 and components thereof is illustrated. Although connections are not shown between the components illustrated in FIG. 5, the components can interact with each other to carry out device functions. In some embodiments, for example, the components are arranged so as to communicate via one or more busses (not shown). It should be understood that FIG. 5 and the following description are intended to provide a general understanding of a suitable environment in which various aspects of the disclosed embodiments can be implemented.

In some embodiments, the user device 106 and/or the networked device 128 illustrated in FIG. 1 are configured like the illustrated MD 500, now described. In some embodiments, the MD 500 is a multimode headset configured to provide access to more than one network type such as the wireless communications network 108 and one or more of the LANs 112, 130.

In some embodiments, the MD 500 includes computer-readable media, including, for example, volatile media, non-volatile media, removable media, and non-removable media. The term "computer-readable media" and variants thereof, as used herein with respect to the MD 500, refer to storage media and communication media. In some embodiments, storage media includes volatile and/or non-volatile, removable, and/or non-removable media. For example, storage media includes random access memory (RAM), read-only memory (ROM), electrically erasable programmable read-only memory (EEPROM), solid state memory or other memory technology, CD-ROM, DVD, or other optical disk-based storage, magnetic tape, magnetic disk storage or other magnetic storage devices, or any other tangible, non-transitory medium that can be used to store the desired information and that can be accessed by the MD 500.

As illustrated in FIG. 5, the MD 500 includes a display 502 for presenting multimedia such as, for example, short messaging system (SMS) messages, enhanced messaging service (EMS), multimedia messaging service (MMS) messages, customer service messages, over-the-air (OTA) messages, unstructured supplementary service data (USSD) messages, voicemail notification messages, application graphical user interfaces (GUIs), text, images, video, telephony functions, such as Caller ID data, setup functions, menus, music, metadata, wallpaper, graphics, Internet content, multicast content, broadcast content, social networking content, game content, device status, preferences settings, map and location data, search information, profile (e.g., vibrate, silent, loud) selection, and the like.

The illustrated MD 500 also includes a processor 504 for processing data and/or executing computer-executable instructions of one or more applications 508 stored in a memory 506. In some embodiments, the application(s) 506 include a user interface (UI) application 510. The UI application 510 interfaces with a client 512 (e.g., an operating system (OS)) to facilitate user interaction with device functionality and data. In some embodiments, the client 512 is one of Symbian OS® (Symbian OS is a registered trademark of Symbian Limited, of London, England), Microsoft® Windows® Mobile OS (Microsoft and Windows are registered trademarks of the Microsoft Corporation of Redmond, Wash., Microsoft® Windows® Phone OS, Palm webOS® (Palm WebOS is a registered trademark of the Palm Trademark Holding Company, of Sunnyvale, Calif.), Palm OS® (also a registered trademark of the Palm Trademark Holding Company), RIM® BlackBerry® OS (RIM and Blackberry are registered trademarks of Research In Motion Limited of Waterloo, Ontario, Canada), Apple® iOS (Apple and iPhone are registered trademarks of the Apple Corporation, of Cupertino, Calif.), or Google Android® OS (Android is a registered trademark of Google, Inc., of Mountain View, Calif.). These operating systems are merely exemplary of the operating systems that can be used in accordance with the embodiments disclosed herein. Other operating systems or versions of the aforementioned operating systems are contemplated.

The UI application 510 aids a user in activating service OTA, if applicable, entering message content, viewing received messages (e.g., MMS messages, SMS messages, USSD messages, OTA messages), answering/initiating calls, entering/deleting data, entering and setting user IDs and passwords for device access, configuring settings, manipulating address book content and/or settings, multimode interaction, interacting with other applications 514, and the like.

In one embodiment, the other applications 514 include an application that when executed by the processor 504 causes the processor 504 to perform one or more steps of the methods described herein below with reference to FIGS. 2 and 4. In some embodiments, the other applications 514 include, for example, visual voicemail applications, messaging applications (e.g., SMS, EMS, and MMS applications), presence applications, text-to-speech applications, speech-to-text applications, add-ons, plug-ins, email applications, music applications, video applications, camera applications, location service applications (LSAs), power conservation applications, game applications, productivity applications, entertainment applications, enterprise applications, combinations thereof, and the like. The applications 508 are stored in the memory 506 and/or as a firmware 516, and are executed by the processor 504. The firmware 516 may also store code for execution during device power up and power down operations.

The MD 500 also includes an input/output (I/O) interface 518 for input/output of data such as location information, presence status information, user IDs, passwords, and application initiation (start-up) requests. In some embodiments, the I/O interface 518 is a hardwire connection such as a USB, mini-USB, audio jack, PS2, IEEE 1394, serial, parallel, Ethernet (RJ48) port, RJ11 port, HDMI port, mini-HDMI, and the like. In some embodiments, the I/O interface 518 is a proprietary interface. In some embodiments, the I/O interface 518 accepts other I/O devices such as keyboards, keypads, mice, interface tethers, stylus pens, printers, solid state memory drives, touch screens, multi-touch screens, touch pads, trackballs, joysticks, directional pads, analog control sticks, microphones (e.g., the microphone 108), remote control devices, monitors, displays (e.g., liquid crystal displays (LCDs), light emitting diode (LED) backlight LCD, and organic LED (OLED)) combinations thereof, and the like. It should be appreciated that the I/O interface 518 may be used for communications between the MD 500 and a network device or local device, instead of, or in addition to, a communications component 520.

The communications component 520 interfaces with the processor 504 to facilitate wired/wireless communications with external systems. Example external systems include, but are not limited to, SMS service centers (SMSCs), intranets, network databases, network storage systems, cellular networks (e.g., the wireless communications network 110), location servers, presence servers, VoIP networks, LANs, wide area networks (WANs), metropolitan area networks (MANs), personal area networks (PANs), the authentication server 118, the confidence server 120, the content server 122, the data store(s) 124, and other networks, network components, and systems described herein. In some embodiments, the external systems are implemented using Wi-Fi™, WiMAX™, combinations and/or improvements thereof, and the like. In some embodiments, the communications component 520 includes a multimode communications subsystem for providing cellular communications via different cellular technologies. In some embodiments, for example, a first cellular transceiver 522 operates in one mode, such as, GSM, and an Nth cellular transceiver 524 operates in a different mode, such as UMTS or LTE. While only two cellular transceivers 522, 524 are illustrated, it should be appreciated that a plurality of transceivers can be included. Moreover, a portion of or the entirety of the communications component 520 may be provided as an add-on to the MD 500. The add-on may attach or wirelessly communicate with the MD 500 via the I/O interface 518 using a standardized or proprietary communication specification.

The illustrated communications component 520 also includes an alternative communications transceiver 526 for use by other communications technologies such as, for example, Wi-Fi™, Wi-Max™, Bluetooth™, near-field communications (NFC), infrared, infrared data association (IrDA), other unlicensed short-range radio frequencies, and the like. In some embodiments, the communications component 520 also facilitates reception from terrestrial radio networks, digital satellite radio networks, Internet-based radio services networks, combinations thereof, and the like.

The MD 500 also includes a SIM slot interface 528 for accommodating a SIM 530 such as a SIM card, a universal SIM (USIM) card, or a universal integrated circuit card (UICC) including one or more SIM applications (e.g., ISIM, SIM, USIM, CSIM).

Audio capabilities for the MD 500 may be provided by an audio I/O component 532 that includes a speaker for the output of audio signals and a microphone to collect audio signals. The microphone may be internal or external to the MD 500, the latter of which may be in wired or wireless communication with the MD 500 via, for example, the I/O interface 518 or the alternative communications transceiver 526.

The MD 500 may also include an image capture and processing system 534 (image system). Photos may be obtained via an associated image capture subsystem of the image system 534, for example, a charge-coupled device (CCD) or active pixel sensor (APS) camera. The MD 500 may also include a video system 536 for capturing, processing, recording, modifying, and/or transmitting video content. Photos and videos obtained using the image system 534 and the video system 536, respectively, may be added as message content to an MMS message and sent to another mobile device.

The MD 500 also includes a location component 538 for sending and/or receiving signals such as, for example, GPS data (e.g., received form the GPS satellite 136), assisted GPS (A-GPS) data, Wi-Fi™/Wi-Max™, and/or cellular network triangulation data, combinations thereof, and the like, for determining a location of the MD 500. The location component 538 may communicate with the communications component 520 to retrieve triangulation data for determining a location. In some embodiments, the location component 538 interfaces with cellular network nodes, telephone lines, satellites, location transmitters and/or beacons, wireless network transmitters and receivers, for example, Wi-Fi™ hotspots, short-range radio transmitters, combinations thereof, and the like. Using the location component 538, the MD 500 obtains, generates, and/or receives data to identify its location, or transmits data used by other devices to determine the location of the MD 500.

The MD 500 also includes a power source 540, such as batteries and/or other power subsystem (AC or DC). The power source 540 may interface with an external power system or charging equipment via a power I/O component 542.

Figure 6:
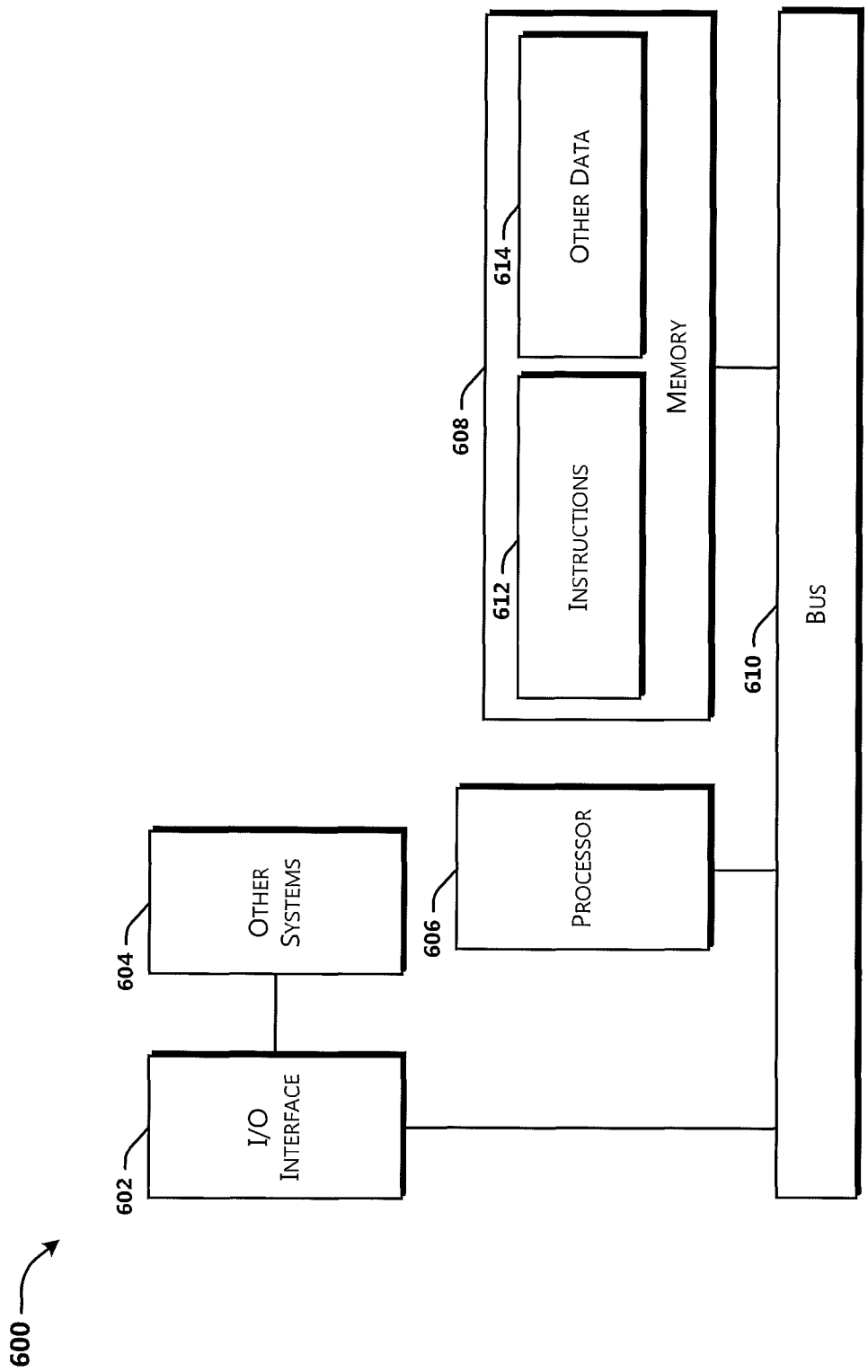
FIG. 6 schematically illustrates a server and components thereof, according to one embodiment disclosed herein.

Referring now to FIG. 6, a server 600 and components thereof are illustrated, according to one embodiment. Although connections are not shown between all components illustrated in FIG. 6, the components can interact with each other to carry out various system functions described herein. It should be understood that FIG. 6 and the following description are intended to provide a general description of a suitable environment in which the various aspects of some embodiments described herein can be implemented.

In one embodiment, the server 600 is the authentication server 118, the confidence server 120, or the content server 122. In another embodiment, the server 600 is a combination of two or more of the authentication server 118, the confidence server 120, and the content server 122.

The server 600 includes an input/output interface 602 for facilitating communications between the server 600 and other systems 604, such as the user device 106, the networked device 128, the tracking system 134, the content server 122, the authentication server 118, and/or the confidence server 120, where appropriate, according to the embodiments described herein.

The server 600 also includes one or more processors 606 that are in communication with one or more memory modules 608 via one or more memory/data busses 610. The processor(s) 606 is configured to execute instructions 612 stored on a non-transitory computer-readable medium, such as the illustrated memory module(s) 608, to perform the various functions described herein above, for example, with reference to FIGS. 1-4.

The term "memory," as used herein to describe the memory module(s) 608, collectively includes all memory types associated with the server 600, such as, but not limited to, processor registers, processor cache, random access memory (RAM), other volatile memory forms, and non-volatile, semi-permanent or permanent memory types; for example, tape-based media, tangible optical media, solid state media, hard disks, combinations thereof, and the like. While the memory module(s) 608 is illustrated as residing proximate the processor(s) 606, it should be understood that the memory module(s) 608 is in some embodiments a remotely accessible storage system. Moreover, the memory module(s) 608 is intended to encompass network memory and/or other storage devices in wired or wireless communication with the server 600.

The memory module(s) 608 may also store other data 614, which may include probability models, user data, confidence analysis algorithms, expected responses, location data, content, and other data described herein above as being associated with one or more of the content server 122, the authentication server 118, and/or the confidence server 120. The other data 614 may be remotely sourced via the I/O interface 602 from network components such as the data store(s) 124.

The law does not require and it is economically prohibitive to illustrate and teach every possible embodiment of the present claims. Hence, the above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. A method for authenticating a user, the method comprising:
   responsive to receiving, at an authentication server, an authentication request from a device, determining a confidence level for the authentication request, wherein determining the confidence level includes consideration of a confidence modifier from an external source, the confidence modifier being selected from a group of confidence modifiers consisting of:
   a user behavior pattern;
   a location received from a previous device to which the user was previously authenticated by the authentication server;
   a location received from a tracking system;
   a location received from a social networking platform;
   a location of a previous device;
   a location of a current device to which the user has been authenticated by the authentication server, the current device being different from the device;
   a characteristic of an area surrounding a previous device to which the user was previously authenticated;
   a characteristic of an area surrounding the device;
   a report of fraudulent activity at a location in which the device is located;
   a reported quality of a connection between a user device to which the user has been authenticated by the authentication server and a wireless telecommunications network;
   a time since the user was authenticated on a previous device;
   a time since the user logged off a previous device;
   a distance from a previous device to which the user was previously authenticated by the authentication server to the device;
   a probability that the user could travel from a previous device to the device;
   a calendar entry associated with a calendar maintained by or for the user, the calendar entry identifying an intended location of the user and a corresponding time the user is expected to be at the intended location;
   a purchasing history of the user;
   a marketing datum associated with the user; and
   a combination of at least two of the modifiers in the group;
   generating, at the authentication server, a confidence-weighted challenge in response to the authentication request, the confidence-weighted challenge being weighted based upon the confidence level;

responsive to receiving, at the authentication server, a challenge response to the confidence-weighted challenge from the device, determining whether to authenticate the user based upon the challenge response;

if the authentication server determines the challenge response satisfies an expected response known to the authentication server, the authentication server permitting authentication of the user; and if the authentication server determines the challenge response does not satisfy the expected response known to the authentication server, the authentication server denying authentication of the user.

2. The method of claim 1, wherein determining the confidence level comprises determining the confidence level at a confidence server that is integrated with the authentication server.

3. The method of claim 1, wherein determining the confidence level comprises the authentication server generating a confidence query, sending the confidence query to a confidence server, and, responsive to sending the confidence query, receiving the confidence level from the confidence server.

4. The method of claim 1, wherein determining the confidence level comprises determining the confidence level based upon an authentication factor included in the authentication request, the authentication factor being selected from a group of authentication factors consisting of an ownership factor, a knowledge factor, and an inherence factor.

5. The method of claim 4, wherein determining the confidence level based upon the authentication factor included in the authentication request comprises determining the confidence level based upon the authentication factor having been received by way of a user login.

6. The method of claim 1, wherein determining whether to authenticate the user based upon the challenge response comprises determining whether to authenticate the user to access content via the device, the content being stored in a content server.

7. The method of claim 6, further comprising, in response to the authentication server determining that the challenge response satisfies the expected response, the authentication server instructing the content server to provide the content to the device, wherein the content is identified in the authentication request.

8. The method of claim 1, wherein determining whether to authenticate the user based upon the challenge response comprises determining whether to authenticate the user for a transaction.

9. An authentication server for authenticating a user, the authentication server comprising:
an input and output (I/O) interface;
a processor; and
a memory having stored thereon computer-executable instructions which, when executed by the processor, cause the processor to perform operations comprising:
responsive to receiving, via the I/O interface, an authentication request from a device, determining a confidence level for the authentication request, wherein determining the confidence level includes consideration of a confidence modifier from an external source, the confidence modifier being selected from a group of confidence modifiers consisting of:
a user behavior pattern;
a location received from a previous device to which the user was previously authenticated by the authentication server;
a location received from a tracking system;
a location received from a social networking platform;
a location of a previous device;
a location of a current device to which the user has been authenticated by the authentication server, the current device being different from the device;
a characteristic of an area surrounding a previous device to which the user was previously authenticated:
a characteristic of an area surrounding the device;
a report of fraudulent activity at a location in which the device is located;
a reported quality of a connection between a user device to which the user has been authenticated by the authentication server and a wireless telecommunications network;
a time since the user was authenticated on a previous device;
a time since the user logged off a previous device;
a distance from a previous device to which the user was previously authenticated by the authentication server to the device;
a probability that the user could travel from a previous device to the device;
a calendar entry associated with a calendar maintained by or for the user, the calendar entry identifying an intended location of the user and a corresponding time the user is expected to be at the intended location;
a purchasing history of the user;
a marketing datum associated with the user; and
a combination of at least two of the modifiers in the group;
generating a confidence-weighted challenge to the authentication request, the confidence-weighted challenge being weighted based upon the confidence level;
responsive to receiving, via the I/O interface, a challenge response to the confidence-weighted challenge from the device, determine determining whether to authenticate the user based upon the challenge response;
if it is determined that the challenge response satisfies an expected response known to the authentication server, permitting authentication of the user; and
if it is determined that the challenge response does not satisfy the expected response known to the authentication server, denying authentication of the user.

10. The authentication server of claim 9, wherein the computer-executable instructions that, when executed by the processor, cause the processor to determine the confidence level further comprise computer-executable instructions that, when executed by the processor cause the processor to determine the confidence level based upon an authentication factor included in the authentication request, the authentication factor being selected from a group of authentication factors consisting of an ownership factor, a knowledge factor, and an inherence factor.

11. The authentication server of claim 10, wherein the computer-executable instructions that, when executed by the processor, cause the processor to determine the confidence level based upon the authentication factor included in the authentication request further comprise computer-executable instructions that, when executed by the processor cause the processor to determine the confidence level based upon the authentication factor having been received by way of a user login.

12. The authentication server of claim 9, wherein the computer-executable instructions that, when executed by the processor cause the processor to determine whether to authenticate the user based upon the challenge response further comprise computer-executable instructions that, when executed by the processor, cause the processor to determine whether to authenticate the user to access content via the device, the content being stored in a content server.

13. The authentication server of claim 12, wherein the computer-executable instructions further comprise computer-executable instructions that when executed by the processor, cause the processor to, in response to determining that the challenge response satisfies the expected response, instruct the content server to provide the content to the device, wherein the content is identified in the authentication request.

14. The authentication server of claim 9, wherein the computer-executable instructions that, when executed by the processor, cause make the processor to determine whether to authenticate the user based upon the challenge response further comprise computer-executable instructions that, when executed by the processor, cause the processor to determine whether to authenticate the user for a transaction.

15. A non-transitory computer-readable storage medium comprising computer-executable instructions that, when executed by a processor cause the processor to perform operations comprising:
  responsive to receiving an authentication request from a device, determining a confidence level for the authentication request, wherein determining the confidence level includes consideration of a confidence modifier from an external source, the confidence modifier being selected from a group of confidence modifiers consisting of:
  a user behavior pattern;
  a location received from a previous device to which the user was previously authenticated by the authentication server;
  a location received from a tracking system;
  a location received from a social networking platform;
  a location of a previous device;
  a location of a current device to which the user has been authenticated by the authentication server, the current device being different from the device;
  a characteristic of an area surrounding a previous device to which the user was previously authenticated;
  a characteristic of an area surrounding the device;
  a report of fraudulent activity at a location in which the device is located;
  a reported quality of a connection between a user device to which the user has been authenticated by the authentication server and a wireless telecommunications network;
  a time since the user was authenticated on a previous device;
  a time since the user logged off a previous device;
  a distance from a previous device to which the user was previously authenticated by the authentication server to the device;
  a probability that the user could travel from a previous device to the device;
  a calendar entry associated with a calendar maintained by or for the user, the calendar entry identifying an intended location of the user and a corresponding time the user is expected to be at the intended location;
  a purchasing history of the user;
  a marketing datum associated with the user; and
  a combination of at least two of the modifiers in the group;
  generating a confidence-weighted challenge to the authentication request, the confidence-weighted challenge being weighted based upon confidence level;
  responsive to receiving a challenge response to the confidence-weighted challenge from the device, determining whether to authenticate the user based upon the challenge response;
  if it is determined that the challenge response satisfies an expected response known to the authentication server, permitting authentication of the user; and
  if it is determined that the challenge response does not satisfy the expected response known to the authentication server, denying authentication of the user.

16. The non-transitory computer-readable storage medium of claim 15, wherein the computer-executable instructions that when executed by the processor, cause the processor to determine the confidence level further comprise computer-executable instructions that, when executed by the processor, cause the processor to determine the confidence level based upon an authentication factor included in the authentication request, the authentication factor being selected from a group of authentication factors consisting of an ownership factor, a knowledge factor, and an inherence factor.

17. The non-transitory computer-readable storage medium of claim 16, wherein the computer-executable instructions that, when executed by the processor, cause the processor to determine the confidence level based upon the authentication factor included in the authentication request further comprise computer-executable instructions that, when executed by the processor, cause the processor to determine the confidence level based upon the authentication factor having been received by way of a user login.

18. The non-transitory computer-readable storage medium of claim 15, wherein the computer-executable instructions that, when executed by the processor, cause the processor to determine whether to authenticate the user based upon the challenge response further comprise computer-executable instructions that, when executed by the processor, cause the processor to determine whether to authenticate the user to access content via the device, the content being stored in a content server.

19. The non-transitory computer-readable storage medium of claim 18, wherein the computer-executable instructions further comprise computer-executable instructions that, when executed by the processor, cause the processor to, in response to determining that the challenge response satisfies the expected response, instruct the content server to provide the content to the device, wherein the content is identified in the authentication request.

20. The non-transitory computer-readable storage medium of authentication server of claim 15, wherein the computer-executable instructions that, when executed by the processor, cause the processor to determine whether to authenticate the user based upon the challenge response further comprise computer-executable instructions that, when executed by the processor, cause the processor to determine whether to authenticate the user for a transaction.

* * * * *